United States Patent Office 3,169,964
Patented Feb. 16, 1965

3,169,964
TRIAZINE DERIVATIVES POSSESSING
APHICIDAL PROPERTIES
Alan Calderbank, Eric Callander Edgar, and John Arthur Silk, Bracknell, England, assignors to Imperial Chemical Industries Limited, Millbank, London, England, a corporation of Great Britain
No Drawing. Filed June 24, 1963, Ser. No. 290,196
Claims priority, application Great Britain, Oct. 25, 1957, 33,358/57; Apr. 23, 1959, 13,939/59
11 Claims. (Cl. 260—249.9)

This application is a continuation-in-part of Serial No. 764,498 and Serial No. 21,134, both now abandoned. The entire subject matter of each of these prior applications is incorporated herein by reference.

The invention relates to new organic compounds and more particularly it relates to triazine derivatives which possess valuable aphicidal properties.

According to the invention therefore we provide s-triazine derivatives of the formula:

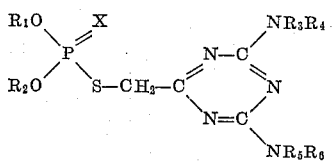

wherein $R_1$ and $R_2$ stand for methyl or ethyl radicals, wherein $R_3$, $R_4$, $R_5$ and $R_6$, which may be the same or different, stand for hydrogen or for lower alkyl radicals or, $R_3$ and $R_4$, or, $R_5$ and $R_6$, may be joined, together with the adjacent nitrogen atom, to form a piperidino ring, and wherein X stands for an oxygen or a sulphur atom, and the salts thereof.

As suitable salts of the said s-triazine derivatives there may be mentioned salts derived from inorganic acids for example hydrochlorides and salts derived from organic acids for example oxalates, p-toluene sulphonates, methane sulphonates and isethionates.

As suitable examples of lower alkyl radicals ($R_3$, $R_4$, $R_5$ and $R_6$) there may be mentioned methyl, ethyl, propyl and butyl radicals.

Preferred compounds of the present invention are 2-diethoxy-phosphinothioylthiomethyl-4:6-diamino-s-triazine,
2-diethoxyphosphinylthiomethyl-4:6-diamino-s-triazine,
2-dimethoxyphosphinothioylthiomethyl-4:6-diamino-s-triazine,
2-dimethoxyphosphinylthiomethyl-4:6-diamino-s-triazine,
2-dimethoxy-phosphinothioylthiomethyl-4-amino-6-methylamino-s-triazine and
2-dimethoxyphosphinothioylthiomethyl-4-amino-6-dimethylamino-s-triazine.

According to a further feature of the invention we provide a process for the manufacture of the s-triazine derivatives which comprises interaction of a compound of the formula:

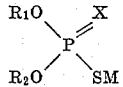

wherein $R_1$, $R_2$ and X have the meaning stated above and wherein M stands for an alkali metal, for example sodium, or an ammonium radical, and a compound of the formula:

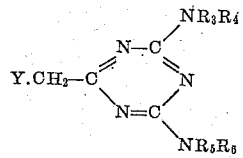

wherein $R_3$, $R_4$, $R_5$ and $R_6$ have the meanings stated above and wherein Y stands for a halogen atom.

As a suitable halogen atom there may be mentioned for example chlorine, bromine or iodine. The reaction may be carried out within the temperature range of 20–150° C. and preferably by heating the reactants together in an inert solvent or diluent for example a lower alcohol for example methanol or ethanol.

The halomethyl-s-triazines used as starting materials may be obtained either by interaction of a compound of the formula:

$$Y-CH_2-COOR_7$$

wherein Y has the meaning stated above and $R_7$ stands for a lower alkyl radical, and a corresponding biguanide of the formula:

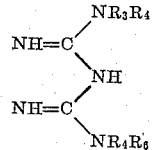

wherein $R_3$, $R_4$, $R_5$ and $R_6$ have the meaning stated above, provided that $R_3$, $R_4$, $R_5$ and $R_6$ do not all stand for alkyl radicals, or by reaction of the corresponding diazomethyl-s-triazine derivative with gaseous hydrogen halide for example gaseous hydrogen chloride.

According to a further feature of the invention we provide a process for the manufacture of some of the s-triazine derivatives which comprises interaction of a compound of the formula:

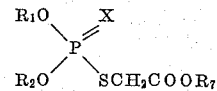

wherein $R_1$, $R_2$, $R_7$ and X have the meaning stated above, and a biguanide of the formula:

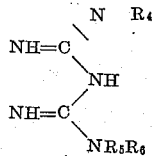

wherein $R_3$, $R_4$, $R_5$ and $R_6$ have the meaning stated above, provided that at least one of $R_3$, $R_4$, $R_5$ and $R_6$ stands for hydrogen.

The reaction may be carried out in the presence of an inert diluent or solvent for example methanol.

The O:O'-dialkyl S-alkoxycarbonylmethylphosphorothiolates and thiolothionates used as starting materials in the above process may be obtained by interaction of a compound of the formula:

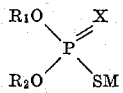

wherein $R_1$, $R_2$, X and M have the meaning stated above, and a compound of the formula:

$$Y-CH_2-COOR_7$$

wherein $R_7$ and Y have the meaning stated above.

The s-triazine derivatives with which this invention is concerned possess outstanding selective aphicidal activity. They display very high contact, residual and systemic properties against aphid species and they are also of value as aphicidal seed dressings. They are also highly toxic to certain other injurious insects and mites. They possess low phytotoxic properties.

Thus according to yet a further feature of the invention we provide insecticidal compositions containing at least one of the s-triazine derivatives described above, in admixture with suitable diluents or carriers.

As suitable compositions there may be mentioned for example aqueous formulations wherein the active ingredient, in the form of the base or a salt thereof, is dissolved or dispersed in aqueous media for example water which may contain organic solvents for example methanol, tetrahydrofurfuryl alcohol or β-ethoxyethanol and also suitable wetting or dispersing agents or other suitable auxiliary agents known to the art to be used in the preparation of such aqueous formulations. A suitable wetting or dispersing agent is the condensation product of ethylene oxide with an alkyl phenol for example the product obtained from the condensation product of octylcresol with about 7–8 molecular proportions of ethylene oxide. Preferred compositions are those containing between 0.0001% and 0.1% by weight of active ingredient.

The insecticidal compositions may also be in the form of seed dressings wherein the active ingredient is admixed with an inert pulverulent solid for example fuller's earth, talc, kaolin or bentonite. The said dressings may be applied to seeds for example delinted cotton seed at a rate of between 1% and 8% by weight of the seed and the young plants eventually obtained from the dressed seed are protected against aphid infestations for example against *Aphis gossypii*.

As stataed above, the s-triazine derivatives possess selective aphicidal properties and the insecticidal compositions described above show activity against aphid infestations such as *Macrosiphum pisi* and *Aphis fabae*.

The invention is illustrated but not limited by the following examples in which the parts are by weight:

*Example 1*

A mixture of 42 parts of 2-chloromethyl-4:6-diamino-s-triazine, 57 parts of sodium O:O′-diethyl-phosphorothioate and 320 parts of ethanol is stirred and heated under reflux for six hours. It is then allowed to cool and stand for 20 hours and is then filtered. The solid residue thus obtained is boiled with ethanol and the mixture is filtered. The filtrate is cooled and there is obtained 2-diethoxyphosphinylthiomethyl-4:6-diamino-s-triazine as a crystalline product, M.P. 169° C.

The hydrochloride is prepared by dissolving the above compound in alcoholic hydrochloric acid and allowing the solution to stand for a few minutes. It has M.P. 144–146° C. with decomposition and it is readily soluble in water.

*Example 2*

8 parts of 2-chloromethyl-4:6-diamino-s-triazine are added to a solution of 10.45 parts of sodium O:O′-diethyl-phosphorodithioate in 80 parts of ethanol and the mixture is stirred and heated under reflux for seven hours. The mixture is cooled and filtered and the solid residue is washed with water. It is crystallised from ethanol and there is thus obtained 2-diethoxyphosphinothioylthiomethyl-4:6-diamino-s-triazine, M.P. 168–169° C.

The hydrochloride may be prepared by passing hydrogen chloride into a solution of the base in ethyl acetate. It has M.P. 174–175° C.

The hydrogen oxalate may be prepared by mixing a solution of the base in hot ethanol with an equivalent quantity of oxalic acid dihydrate in acetone and removing the solvents by evaporation. It has M.P. 120–123° C.

When the 2-chloromethyl-4:6-diamino-s-triazine used as starting material is replaced by an equivalent proportion of 2 - chloromethyl - 4:6-bis-)dimethylamino)-s-triazine, there is likewise obtained 2-diethoxyphosphinothioylthiomethyl - 4:6 - bis(dimethyl-amino)-s-triazine, M.P. 60–62° C.

*Example 3*

A solution of 14 parts of O:O′-diethyl S-ethoxycarbonylmethyl phosphorothiolothionate in 120 parts of methanol is stirred, and a warm solution of 5 parts of biguanide in 300 parts of methanol is added gradually during a period of two hours. Stirring is continued for a further three hours and the mixture is then allowed to stand for a further sixteen hours. The mixture is filtered and the solid residue so obtained is 2-diethoxyphosphinothioylthiomethyl-4:6-diamino-s-triazine, M.P. 169° C., identical with the product of Example 2.

The O:O′-diethyl S-ethoxycarbonylmethyl phosphorothiolothionate used as starting material may be obtained as follows:

93 parts of O:O′-diethyl phosphorodithioic acid are added with cooling to a solution of sodium ethoxide (prepared from 11.5 parts of sodium) in 240 parts of ethanol. 0.25 part of sodium iodide is added and 61.3 parts of ethyl chloracetate are then run in with stirring during 40 minutes. The mixture is heated under reflux for two hours and is then treated with 5 parts of water. The mixture is filtered and the filtrate is evaporated under reduced pressure to remove most of the ethanol. The residue is treated with water and ether and the ether extract is separated, washed twice with water and dried over sodium sulphate. The ether is removed and distillation yields O:O′-diethyl S-ethoxycarbonylmethylphosphorothiolothionate, B.P. 105–107° C./0.005 mm. $n_D^{27}$ 1.4960.

*Example 4*

A mixture of 8 parts of 2-chloromethyl-4:6-bis(methylamino)-s-triazine, 7.5 parts of sodium O:O′-diethyl phosphorothiolate, 160 parts of ethanol and 40 parts of benzene is stirred and heated under reflux for 6 hours. The reaction mixture is allowed to cool and is then filtered. The filtrate is evaporated to dryness under reduced pressure and the residue is taken up in 67 parts of chloroform. The mixture is filtered and the filtrate is evaporated. The residual solid is crystallised from ethyl acetate and there is thus obtained 2-diethoxyphosphinylthiomethyl-4:6-bis(methylamino)-s-triazine, M.P. 228° C.

The 2 - chloromethyl-4:6-bis(methylamino)-s-triazine used as starting material may be prepared as follows:

33.1 parts of 1:5-dimethylbiguanide dihydrochloride are added to a solution of sodium methoxide prepared from 7.6 parts of sodium and 160 parts of methanol. The mixture is heated under reflux for four hours and is then filtered. 20 parts of ethyl chloroacetate are then added to the filtrate at ordinary temperature during thirty minutes and the solution is allowed to stand for 16 hours. The mixture is filtered and the solid residue is crystallised from β-ethoxyethanol to give 2-chloromethyl-4:6-bis(methylamino)-s-triazine, M.P. 228° C.

*Example 5*

A solution of 15.8 parts of O:O′-dimethyl phosphorodithioic acid in 125 parts of methanol is treated with 5.3 parts of anyhdrous sodium carbonate. 15.9 parts of 2-chloromethyl-4:6-diamino-s-triazine are then added and the mixture is heated under reflux for 7 hours. The reaction mixture is then cooled and filtered and the solid residue is washed with water and dried. It is crystallised from aqueous methanol or aqueous β-ethoxyethanol and there is thus obtained 2-dimethoxyphosphinothioylthiomethyl-4:6-diamino-s-triazine, M.P. 164–166° C.

2.8 parts of the above base are dissolved in a solution of 1 part of methanesulphonic acid in 10 parts of water by stirring at 50–60° C. The solution is cooled and filtered and the solid residue so obtained is 2-dimethoxyphosphinothioylthiomethyl-4:6-diamino-s-triazine methanesulphonate, M.P. 160–162° C.

Example 6

A mixture of 9.2 parts of sodium O:O'-dimethyl phosphorothiolate, 8.0 parts of 2-chloromethyl-4:6-diamino-s-triazine and 65 parts of methanol is heated under reflux for 18 hours and the reaction mixture is then cooled and filtered. The solid residue is freed from sodium chloride by washing with water. It is then crystallised from water and there is thus obtained 2-dimethoxyphosphinyl-thiomethyl-4:6-diamino-s-triazine, M.P. 198° C.

Example 7

6.9 parts of sodium are reacted with 120 parts of methanol and 19 parts of 1-methylbiguanide hydrochloride are then added. The mixture is heated under reflux for 3 hours and cooled, and then 24.5 parts of ethyl chloroacetate are added slowly over 25 minutes. After standing for an hour the reaction mixture is filtered and the solid residue is crystallised from water. This provides 2 - chloromethyl-4-amino-6-methylamino-s-triazine, M.P. 167–169° C. A mixture of 6.9 parts of the latter compound, 7.7 parts of sodium O:O'-dimethyl phosphorothiolate and 60 parts of ethanol is heated under reflux for 7 hours. The reaction mixture is cooled and filtered, and the filtrate is evaporated under reduced pressure. The residue is treated with water and the aqueous mixture is filtered. The solid residue is crystallised from water and there is thus obtained 2-diethoxyphosphinylthiomethyl-4-amino-6-methylamino-s-triazine, M.P. 81–83° C.

Example 8

7.9 parts of O:O'-dimethylphosphorodithioic acid in 64 parts of methanol are neutralised at a temperature of 20–30° C. by passing in dry ammonia gas with cooling. 8.7 parts of 2-chloromethyl-4-amino-6-methylamino-s-triazine are then added and the mixture is heated under reflux for 90 minutes. The reaction mixture is concentrated under reduced pressure and then filtered and the filtrate is diluted with water and cooled. The aqueous mixture is filtered and the solid residue is crystallised from aqueous methanol and there is thus obtained 2-dimethoxyphosphinothioylthiomethyl - 4 - amino-6-methylamino-s-triazine, M.P. 126–127° C.

Using an equivalent quantity of 2-chloromethyl-4-amino-6-dimethylamino-s-triazine in place of the 2-chloromethyl-4-amino-6-methylamino-s-triazine used as starting material, there is obtained in a similar manner, an oil which solidifies on cooling. It is crystallised from aqueous methanol and there is thus obtained 2-dimethoxyphosphinothioylthiomethyl - 4 - amino-6-dimethylamino-s-triazine, M.P. 77–79° C. The 2-chloromethyl-4-amino-6-dimethylamino-s-triazine used as starting material may be obtained by the process as described in Example 9.

Example 9

23 parts of sodium are dissolved in 400 parts of ethanol and 55 parts of 1:1-dimethylbiguanide hydrochloride are added. The mixture is heated under reflux for 2 hours and cooled and is then treated during 30 minutes with 82 parts of ethyl chloroacetate. After two hours the reaction mixture is filtered and the solid residue is crystallised from aqueous ethanol thus providing 2-chloromethyl-4-amino-6-dimethylamino-s-triazine, M.P. 181–182° C. 9.4 parts of the latter compound and 9.6 parts of sodium O:O'-diethyl phosphorothiolate are heated under reflux in 80 parts of ethanol for 7 hours. The reaction mixture is cooled and filtered and the filtrate is evaporated. The residue is treated with dilute aqueous ethanol and the mixture is filtered. The solid residue is crystallised from a mixture of benzene and petroleum ether (B.P. 60–80° C.) and there is thus obtained 2-diethoxy-phosphinylthiomethyl-4-amino-6-dimethylamino-s-triazine, M.P. 92–93° C.

Example 10

A mixture of 2.4 parts of O:O'-diethyl-s-ethoxycarbonylmethyl phosphorothiolate, 1.3 parts of 1:5-dimethylbiguanide and 50 parts of dry pyridine is stirred at a temperature of 18–23° C. for 6 hours and is then allowed to stand for about 18 hours. The reaction mixture is filtered and the filtrate is evaporated under reduced pressure. The residue is dissolved in ethanol and again evaporated to complete the removal of pyridine. The crystalline residue is recrystallised from isobutanol and there is thus obtained 2-diethoxyphosphinylthiomethyl-4:6-bis(methylamino)-s-triazine, M.P. 134–136° C., identical with the product described in Example 4.

O:O'-diethyl S-ethoxycarbonylmethyl phosphorothiolate may be prepared by the following procedure:

69 parts of diethyl phosphite are added to 320 parts of alcohol in which 11.5 parts of sodium have been dissolved. 16 parts of sulphur are then added in small portions, so that the temperature does not exceed 50° C. 61.4 parts of ethyl chloroacetate are next added and the reaction mixture is heated under reflux for 2 hours and then cooled. The bulk of the alcohol is removed by evaporation and the residue is treated with ether and water. The ethereal extract is separated, washed with water, dried over anhydrous sodium sulphate and then distilled. There is thus obtained O:O'-diethyl S-ethoxycarbonylmethyl phosphorothiolate, B.P. 96° C./0.01 mm.

Example 11

A mixture of 9.5 parts of 1:5-dimethyl-biguanide, 20.4 parts of O:O'-diethyl S-ethoxycarbonyl-methyl phosphorothiolothionate and 80 parts of ethanol is stirred at a temperature of 18–23° C. during 24 hours. The mixture is then filtered and the solid residue is washed with ethanol. There is thus obtained 2-diethoxyphosphinothioylthiomethyl-4:6-bis-(methylamino)-s-triazine, M.P. 131–133° C.

The hydrochloride of this base is prepared by dissolving 3 parts of the above compound in 20 parts of concentrated aqueous hydrochloric acid and then filtering the reaction mixture after one hour. There is thus obtained 2-diethoxyphosphinothioylthiomethyl-4:6-bis(methylamino)-s-triazine hydrochloride, M.P. 134–137° C.

Example 12

A mixture of 6.45 parts of 1-ethylbiguanide, 13.6 parts of O:O'-diethyl S-ethoxycarbonylmethyl phosphorothiolothionate and 65 parts of ethanol is stirred at a temperature of 18–23° C. for 6 hours. The reaction mixture is concentrated under reduced pressure and then diluted with water. The mixture is filtered and the solid residue is crystallised from aqueous ethanol. There is thus obtained 2 - diethoxy-phosphinothioylthiomethyl-4-amino-6-ethylamino-s-triazine, M.P. 79–83° C.

The hydrochloride of this base is prepared by dissolving the above compound in a solution of hydrogen chloride in ethanol and diluting the solution so obtained with ether. There is thus obtained 2-diethoxyphosphinothioylthiomethyl-4-amino-6-ethyl-amino - s - triazine hydrochloride, M.P. 149–151° C.

Example 13

11.5 parts of 1:1-pentamethylenebiguanide hydrochloride are added to a solution of 11.5 parts of sodium in 400 parts of methanol and the mixture is heated under reflux for 3 hours and then cooled. 61 parts of ethyl chloroacetate are added slowly during 30 minutes and after one hour, the mixture is filtered and the solid residue is washed with water. It is then crystallised from aqueous methanol and thus provides 2-chloromethyl-4-amino-6-piperidino-s-triazine, M.P. 158–160° C.

20.6 parts of this triazine are added to a solution of 17.5 parts of sodium O:O'-diethyl phosphorothiolate in 110 parts of ethanol and the mixture is then heated under reflux for 7 hours. The reaction mixture is filtered and the filtrate is evaporated under reduced pressure. The residual oil is dissolved in ether and the ethereal solution is washed with water, dried over anhydrous sodium sulphate and then evaporated. The residual oil is dissolved in ethanol and the solution is treated with alcoholic picric acid. The mixture is filtered and the solid residue is crystallised from ethanol. There is thus obtained 2-diethoxyphosphinylthiomethyl - 4 - amino-6-piperidino-s-triazine picrate, M.P. 166–168° C. When this picrate is stirred in aqueous ethanol with the hydroxide form of Amberlite resin IRA–400, there is obtained 2-diethoxyphosphinylthiomethyl - 4 - amino-6-piperidino-s-triazine, M.P. 112–114° C.

Example 14

A solution of 2.3 parts of 1-n-butylbiguanide and 4.0 parts of O:O'-diethyl S-ethoxycarbonylmethyl phosphorothiolothionate in 25 parts of ethanol is allowed to stand at a temperature of 18–23° C. for 24 hours. The solvent is then removed by evaporation under reduced pressure and the residue is dissolved in ether. The ethereal solution is washed with water, dried over anhydrous sodium sulphate and evaporated. The residual oil is treated with alcoholic picric acid and there is thus obtained the picrate of 2-diethoxy-phosphinothioylthiomethyl - 4 - amino-6-n-butylamino-s-triazine, M.P. 127–130° C.

Example 15

The process described in Example 1 is repeated except that the 2-chloromethyl-4:6-diamine-s-triazine used as starting material is replaced by an equivalent quantity of 2-bromomethyl-4:6-diamino-s-triazine. There is thus obtained in a similar manner 2-diethoxy-phosphinylthiomethyl-4:6-diamino-s-triazine, M.P. 169° C., identical with the product obtained in Example 1.

The process described above is repeated except that the 2-bromomethyl-4:6-diamino-s-triazine used as starting material is replaced by an equivalent quantity of 2-iodomethyl-4:6-diamino-s-triazine. There is again obtained, in a similar manner, 2-diethoxyphosphinylthiomethyl-4:6-diamino-s-triazine, M.P. 169° C., identical with the product obtained in Example 1.

The 2-bromomethyl-4:6-diamino-s-triazine used as starting material is prepared by adding ethyl bromoacetate (167 parts) slowly to biguanide (101 parts) in methanol (800 parts) at 0° C. The mixture is filtered and the solid residue is crystallised from aqueous alcohol to give the desired product, M.P. 226–229° C. In a similar manner, the use of ethyl iodoacetate (214 parts) in place of ethyl bromoacetate gives 2-iodomethyl-4:6-diamino-s-triazine, M.P. 182–184° C.

Example 16

80 parts of 2-diethoxyphosphinothioylthiomethyl-4:6-diamino-s-triazine are dissolved in 10,000 parts of methanol and the solution is poured into 1,000,000 parts of water containing 500 parts of the condensation product of octylcresol with 7–8 molecular proportions of ethylene oxide. When this preparation is sprayed on to broad bean plants which are then infested with *Macrosiphum pisi*, a 100% kill of the latter is obtained within 24 hours.

Example 17

8 parts of 2-diethoxyphosphinylthiomethyl - 4:6 - diamino-s-triazine hydrochloride are dissolved in 1,000,000 parts of water containing 500 parts of the condensation product of octylcresol with 7–8 molecular proportions of ethylene oxide. When *Macrosiphum pisi* are sprayed with this preparation, 97% of the aphids are killed within 24 hours.

Example 18

8 parts of 2-diethoxyphosphinylthiomethyl - 4:6 - diamino-s-triazine are dissolved in 1000 parts of methanol and the solution is diluted with 100,000 parts of water containing 50 parts of the condensation product of octylcresol with 7–8 molecular proportions of ethylene oxide. When broad bean plants are sprayed with this preparation and then infested three days later with *Aphis fabae*, a 100% kill of the aphids results indicating that the preparation has marked residual aphicidal activity.

Example 19

1 part of 2-diethoxyphosphinylthiomethyl - 4:6 - diamino-s-triazine is dissolved in 20 parts of methanol and the solution is poured into 2000 parts of water containing 1 part of the condensation product of octylcresol with 7–8 molecular proportions of ethylene oxide. When a pair of leaves half-way up the stem of a broad bean plant infested with *Aphis fabae* is immersed in this preparation a complete kill of aphids above the immersed leaves is obtained in less than 24 hours, and below the leaves in two days. There are no phytotoxic symptoms, and the preparation therefore possesses valuable systemic activity.

Example 20

A seed dressing is prepared by ball-milling equal parts of 2-diethoxyphosphinylthiomethyl-4:6-diamino-s-triazine and fuller's earth for 8 hours. Delinted cotton seed is dressed at the rate of 8% by weight with this preparation before planting. The seedlings eventually obtained are completely protected against continuous infestation by *Aphis gossypii* for at least three weeks.

Example 21

100 parts of 2-diethoxyphosphinylthiomethyl-4:6-diamino-s-triazine hydrochloride are dissolved in 1,000,000 parts of water containing 500 parts of the condensation product of octylcresol with 7–8 molecular proportions of ethylene oxide. When some beneficial insects including honey bees, Aphidius species of aphis parasite adults and pupae, ladybird adults and larvae, Syrphid fly larvae, and predatory capsids *Anthacoris nemorum*, are sprayed with this preparation, no kills of the insects are obtained.

Ladybird adults and larvae, and Syrphid fly larvae feeding on aphids are unaffected, while the aphids themselves are killed by the same concentration of toxicant.

Example 22

1 part of 2-dimethoxyphosphinothioylthiomethyl-4:6-diamino-s-triazine is dissolved in 5 parts of tetrahydrofurfuryl alcohol at 50° C. and the solution is added to 100,000 parts of water containing 50 parts of the condensation product of octylcresol with 7–8 molecular proportion of ethylene oxide. This preparation gives a 100% kill of *Macrosiphum pisi* on plants which are sprayed with it.

Example 23

1 part of 2-dimethoxyphosphinothioylthiomethyl-4:6-diamino-s-triazine is added to 5 parts of water containing 0.56 part of isethionic acid (2-hydroxyethanesulphonic acid) with stirring. The resulting solution is mixed with 10,000 parts of water containing 5 parts of the condensation product of octylcresol with 7–8 molecular proportions of ethylene oxide. Plants sprayed with this solution are protected against infestation by aphid species.

According to the present invention we also provide new s-triazine derivatives of the formula:

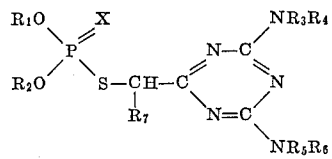

in which $R_1$ and $R_2$ are methyl or ethyl radicals; $R_3$ is a hydrogen atom; $R_4$, $R_5$, and $R_6$, which can be the same or different, are such a hydrogen atom or a methyl, ethyl, propyl or butyl radical, or $R_5$ and $R_6$ together with their adjacent nitrogen atom constitute a piperidino ring; $R_7$ is a methyl, ethyl, propyl or butyl radical; and X is an oxygen or a sulphur atom; and acid addition salts thereof.

Compounds which in particular have been found to possess useful aphicidal activity are those in which the groups $R_4$, $R_5$ and $R_6$ together have a total number of carbon atoms not exceeding six, and especially where $R_4$ is a hydrogen atom.

In general, the aphicidal activity of the compounds of the invention decreases with increase in the number of carbon atoms in group $R_7$ which is preferably a methyl radical.

The acid addition salts of the present invention can be salts derived from an inorganic acid, for example hydrochlorides, or from an organic acid, for example oxalates, p-toluene sulphonates, methane sulphonates or isethionates.

The invention also includes a process for the preparation of s-triazine derivatives, in which a compound of the formula:

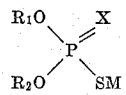

is reacted with a haloalkyl-s-triazine of the formula:

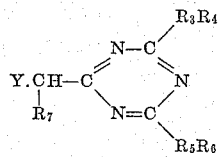

where $R_1$, $R_2$, $R_3$, $R_4$, $R_5$, $R_6$, $R_7$ and X have any of the meanings given to them above; M is an atom of an alkali metal, for example sodium, or an ammonium radical; and Y is a halogen atom, for example bromine. The process is preferably performed within the temperature range 20–150° C. though the temperature chosen naturally depends to a large extent upon the reactivity of the reactants. Preferably the reactants are in solution or dispersion in a suitable solvent or diluent, for example water or a lower alcohol such as methanol or ethanol.

The haloalkyl s-triazine used as starting material in the process described above can be obtained by a process in which a compound of the formula:

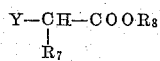

is reacted with a biguanide of the formula:

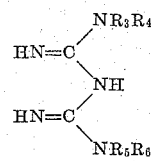

where $R_3$, $R_4$, $R_5$, $R_6$, $R_7$ and Y have any of the meanings given to them above, and $R_8$ is a lower alkyl radical, for example methyl or ethyl.

The invention also includes pesticidal compositions containing, as active ingredient, a compound of the invention or an acid addition salt thereof, in admixture with a suitable diluent or carrier. The pesticidal compositions can, for example, be a liquid composition in which the active ingredient is dissolved or dispersed in a suitable liquid medium, or it can be a powder composition.

The compounds of the invention have only low solubility in water, but are in general sufficiently soluble to enable aqueous solutions of low pesticidal concentration to be prepared. However, in order to facilitate the preparation of aqueous solutions, especially where higher pesticidal concentrations are required, it has been found advantageous to dissolve the compound initially in a small quantity of methanol, tetrahydrofurfuryl alcohol, diacetone alcohol or β-ethoxyethanol, and to dilute the resulting organic solution with sufficient water to obtain the desired aqueous solution.

Where the pesticidal compositions of the invention is a powder composition, the active ingredient can be in admixture with an inert power diluent, for example fuller's earth, talc, kaolin, kieselguhr or bentonite. If desired, the pesticidal compositions, whether liquid or solid, can contain a suitable wetting or dispersing agent or other suitable auxiliary agent known in the art as being useful in pesticidal compositions. The powder pesticidal compositions referred to above can be used as seed dressings for the treatment of seed in order to provide protection against aphid attack for plants subsequently grown from the seed.

The invention also includes a method of combating aphids, for example *Macrosiphum pisi*, in which the aphids, or plants susceptible to attack by aphids are treated with a compound or a pesticidal composition of this invention.

The invention is illustrated by the following examples in which (except where otherwise stated) the parts referred to are parts by weight.

*Example 24*

This example describes the preparation of 2-α-(diethoxyphosphinylthio)-ethyl-4:6-diamino-s-triazine.

Sodium (916 parts) was dissolved in methanol (200 parts), biguanide sulphate (30 parts) was added, and the mixture heated under reflux with stirring for 3 hours, and then cooled. Ethyl-α-bromopropionate (38.1 parts) was added as drops to the reaction mixture which was stirred for a further two hours. The solid material obtained was collected by filtration and thoroughly washed with water, the washed material being 2-α-bromo-ethyl-4:6-diamino-s-triazine, M.P. 223–225° C. The latter compound (19.8 parts) and sodium OO-diethyl phosphorothiolate (19.2 parts) were dissolved in absolute ethanol (110 parts) and the solution heated under reflux for 7 hours after which the mixture was cooled and filtered, the filtrate concentrated, and then diluted with several volumes of water. On standing, 2-α-(diethoxyphosphinylthio)ethyl-4:6-diamino-s-triazine, M.P. 167–9° C. was obtained as a crystalline product.

This product has been tested and found to be active against the aphid species *Macrosiphum pisi*. The compound was tested in the form of a number of aqueous solutions covering a range of concentrations, and each containing 0.5% by weight of a wetting agent. Similar aqueous solutions of various concentrations of the commercial pesticide parathion were used as a standard for comparison.

The method of testing against *M. pisi* was as follows:

Adult, apterous, viviparous females were sprayed under a Potter Tower apparatus with 2 cc. of each of the aqueous solutions of the test chemical and of parathion, three replicates of 30–40 aphids being used with each solution. After being sprayed, the aphids were transferred to 2-oz. jars containing clean broad bean leaves, which were then stored under conditions of constant temperature and humidity for 24 hours, at the end of which time the number of dead aphids was counted and the LD 50 value calculated.

Using the LD 50 values obtained for the test chemical and parathion, the parathion equivalent obtained was 2.5, thus illustrating the effectiveness of the test compound against *M. pisi*.

*Example 25*

This example illustrates the activity of the product of Example 24 against a second aphid species, *Aphis fabae*.

2 - α-(diethoxyphosphinylthio) ethyl-4:6-diamino-s-triazine (16 parts) was dissolved in methanol (1000 parts) and the solution diluted with water (100,000 parts) containing 50 parts of the condensation product of octylcresol with 7–8 molecular proportions of ethylene oxide. When broad bean plants were sprayed with this pesticidal composition and then infested three days later with *Aphis fabae*, a 100% kill of the aphids was obtained indicating that the preparation has marked residual aphicidal activity.

*Example 26*

The hydrochloride of 2-α-(diethoxyphosphinylthio)

ethyl-4:6-diamino-s-triazine was prepared by dissolving the latter compound in ethyl acetate and passing hydrogen chloride into the solution. The hydrochloride was obtained as a solid having a melting point of 155–156° C. with decomposition.

*Example 27*

This example describes the preparation of 2-α-(diethoxyphosphinothioylthio) - propyl - 4 - amino-6-methylamino-s-triazine.

Sodium (2.3 parts) was dissolved in methanol (80 parts), methyl biguanide dihydrochloride (11 parts) was added, and the mixture agitated at room temperature for thirty minutes. The sodium chloride which had separated out was removed by filtration and ethyl α-bromobutyrate (10 parts) added to the filtrate. After standing at room temperature for 24 hours the solution was evaporated to dryness leaving a gum, which on recrystallisation from a mixture of benzene and petroleum ether afforded 2-α-bromopropyl-4-amino-6-methylamino-s-triazine, M.P. 66–70° C. The latter compound (2.8 parts) and ammonium OO-dimethyl phosphorodithioate (2.0 parts) were dissolved in methanol (8 parts) and the solution heated under reflux for 6 hours and then evaporated to dryness. The residue obtained was dissolved in chloroform and the chloroform solution washed with water, dried with sodium sulphate and the chloroform removed by evaporation leaving 2 - α-(dimethoxyphosphinothioylthio-) propyl-4-amino-6-methylamino-s-triazine as a non-crystallisable gum.

This product was tested against the aphid species *Macrosiphum pisi* by the method described in Example 24, and the parathion equivalent was found to be 0.8 thus indicating a good degree of protection against the aphids.

*Example 28*

This examples describes the preparation of 2-α-(diethoxyphosphinylthio)-n-amyl 4:6-diamino-s-triazine.

Biguanide (2.9 parts) and ethyl α-bromohexoate (6.4 parts) were dissolved in methanol (40 parts) and the solution allowed to stand at room temperature for 2 weeks. At the end of that time the solution was evaporated to dryness and the residue thus obtained was recrystallised from aqueous methanol giving 2-α-bromoamyl-4:6-diamino-s-triazine, M.P. 158–160° C. The latter compound (2.0 parts) and sodium OO-dimethyl-phosphorothioate (1.3 parts) were dissolved in methanol (20 parts) and the solution heated under reflux for 9 hours. The solution was then cooled, filtered to remove sodium bromide which had separated out and evaporated to dryness leaving 2-α-(dimethoxyphosphinothioyl) - n - amyl 4:6-diamino-s-triazine.

*Example 29*

This example illustrates the effectiveness of the hydrochloride of Example 26 against the aphid species *M. pisi*.

2 - α-(diethoxyphosphinylthio) ethyl-4:6-diamino-s-triazine hydrochloride (16 parts) was dissolved in water (1 million parts) containing 500 parts of the condensation product of octylcresol with 7–8 molecular proportions of ethylene oxide. When broad bean plants infected with *Macrosiphum pisi* were sprayed with this pesticidal composition, 100% of the aphids were killed within 24 hours.

What we claim is:

1. A compound selected from the group consisting of a triazine which in free base form has the formula:

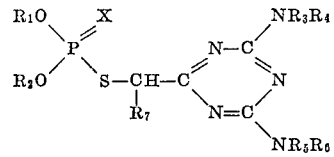

wherein $R_1$ and $R_2$ are selected from the group consisting of methyl and ethyl; $R_3$ and $R_4$ are selected from the group consisting of hydrogen, lower alkyl and, taken together, the atoms necessary to form a piperidino ring; $R_5$ and $R_6$ are selected from the group consisting of hydrogen, lower alkyl and, taken together, the atoms necessary to form a piperidino ring; $R_7$ is selected from the group consisting of hydrogen and lower alkyl; and X is an atom selected from the group consisting of oxygen and sulfur atoms, and the acid addition salts thereof.

2. 2 - dimethoxyphosphinothioylthiomethyl - 4:6-diamino-s-triazine.

3. 2 - diethoxy - phosphinothioylthiomethyl-4:6-diamino-s-triazine.

4. 2 - diethoxyphosphinylthiomethyl - 4:6-diamino-s-triazine.

5. 2 - dimethoxyphosphinylthiomethyl - 4:6-diamino-s-triazine.

6. 2 - dimethoxyphosphinothioylthiomethyl-4-amino-6-methylamino-s-triazine.

7. 2 - dimethoxyphosphinothioylthiomethyl - 4 - amino-6-dimethylamino-s-triazine.

8. 2 - α - (diethoxyphosphinylthio)ethyl - 4:6-diamino-s-triazine.

9. 2 - α - (diethoxyphosphinylthio)ethyl - 4:6-diamino-s-triazine hydrochloride.

10. 2 - α - (dimethoxyphosphinylthio) - n-amyl-4:6-diamino-s-triazine.

11. 2 - α - (dimethoxyphosphinothioylthio)propyl - 4-amino-6-methylamino-s-triazine.

References Cited in the file of this patent

UNITED STATES PATENTS

| | | |
|---|---|---|
| 2,822,364 | Schuller | Feb. 4, 1958 |
| 2,848,451 | Schuller | Aug. 19, 1958 |
| 2,887,432 | Baker et al. | May 19, 1959 |
| 2,911,337 | Uhlenbroek et al. | Nov. 3, 1959 |